(12) United States Patent
Vlaminck et al.

(10) Patent No.: US 9,246,921 B1
(45) Date of Patent: Jan. 26, 2016

(54) SECURE EXTERNAL ACCESS TO DEVICE AUTOMATION SYSTEM (71) Applicant: SmartThings, Inc., Washington, DC (US)

(72) Inventors: Scott David Vlaminck, Saint Paul, MN (US); Jesse Curtis O'Neill-Oine, Lauderdale, MN (US); Robert Max Florian, Jr., Olney, MD (US); Jeffrey Hagins, Santa Rosa Valley, CA (US)

(73) Assignee: SmartThings, Inc., Palo Alto, CA (US)

( * ) Notice: Subject to any disclaimer, the term of this patent is extended or adjusted under 35 U.S.C. 154(b) by 40 days.

(21) Appl. No.: 14/159,398

(22) Filed: Jan. 20, 2014

(51) Int. Cl.
*H04L 29/06* (2006.01)
*G06F 21/62* (2013.01)

(52) U.S. Cl.
CPC .............. *H04L 63/10* (2013.01); *G06F 21/62* (2013.01)

(58) Field of Classification Search
None
See application file for complete search history.

(56) References Cited

U.S. PATENT DOCUMENTS

| 2004/0098595 | A1* | 5/2004 | Aupperle et al. | 713/185 |
| 2005/0228693 | A1* | 10/2005 | Webb et al. | 705/2 |
| 2014/0075513 | A1* | 3/2014 | Trammel et al. | 726/4 |

* cited by examiner

*Primary Examiner* — David Le
(74) *Attorney, Agent, or Firm* — Van Pelt, Yi & James LLP (57) ABSTRACT A secure external access method provides an external system with access to a device automation system implementing automatic control of one or more devices in an automation environment. The external access method enables external system access to devices only when the devices have been authorized for external access and the external system has the proper authentication credential. External access endpoints are dynamically defined by the web service automation applications and are unique to each installed instance of the web service automation application.

19 Claims, 8 Drawing Sheets

SECURE EXTERNAL ACCESS TO DEVICE AUTOMATION SYSTEM

BACKGROUND OF THE INVENTION

The idea of the "smart home" has been around since the 1950s but never became mainstream. However, with the advent of the Internet and the wide adoption of smartphones, the smart home concept or home automation can now be realized where appliances and devices in a home can be connected to the Internet and be capable of being monitored and controlled remotely. However, implementation of Internet controllable devices requires knowledge of networking, server management, communication protocols and also network security.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a method to provide secure external access to a device automation system generates dynamic access endpoints that are created by the installation of a web service automation application and configuration of the web service automation application for specific devices in a user's environment. The secure external access method of the present invention can be advantageously applied in an automation environment to expose dynamic access endpoints that are created by a user for controlling authorized physical devices in the user's home or office or other types of premises.

In some embodiments, the dynamic access endpoint is unique for each instance of an installed web service automation application and each access endpoint is restricted to devices specifically authorized by the user for external access. In other words, the installation and configuration of the web service automation application defines the security boundary for the external system. The external system may access a device in a user's physical graph only when the user has specifically granted the access and has specifically authorized the particular device for external access. In some embodiments, the dynamic access endpoints are API (application programming interface) endpoints. Each unique API endpoint is specified by a unique URL (universal resource locator).

Figure 1:
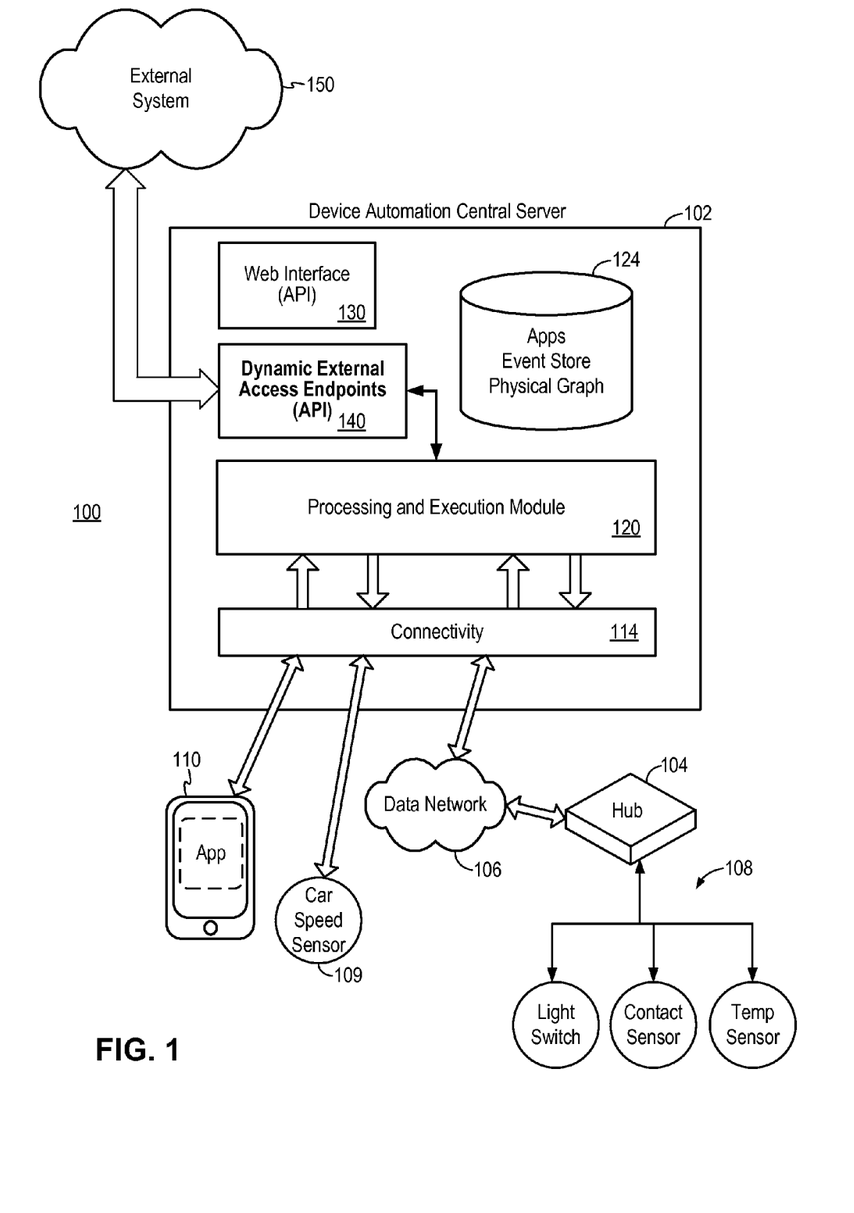
FIG. 1 is a block diagram illustrating a web-based device automation system in embodiments of the present invention.

FIG. 1 is a block diagram illustrating a web-based device automation system in embodiments of the present invention. Referring to FIG. 1, a web-based device automation system 100 ("system 100") includes a web-based device automation central server 102 ("central server 102") communicating with a hub 104 over a data network 106, such as the Internet or an intranet. Central server 102 implements the processing and control for remotely monitoring and controlling one or more devices 108 over the data network 106. As thus configured, web-based device automation system 100 enables everyday objects to respond to digital controls. In one embodiment, central server 102 is a server connected to and communicating with hub 104 over the data network 106. Hub 104 is a module installed in an environment, which can be a home, an office, a factory, a building, an outdoor location, or other types of premises, for connecting one or more devices or appliances 108 in that environment to the data network 106. In operation, hub 104 functions as a bridge between the data network 106 and devices 108 to enable devices 108 to be connected to the data network. In this manner, devices 108 can be monitored and controlled through hub 104 by web services provided by central server 102 without requiring each device 108 to implement full network communication capability.

In the example shown in FIG. 1, hub 104 is connected to a group of devices 108 including sensing devices that generate data and actuating devices that control a function. The group of devices 108 can include everyday devices and appliances found in a home or an office. In the present illustration, the group of devices 108 includes a light switch as an actuating device, a contact sensor and a temperature sensor as sensing devices. Devices 108 shown in FIG. 1 are illustrative only and not intended to be limiting. The web-based device automation central server of the present invention can be applied to monitor and control many types of devices applied in any environment. In the following description, the web-based device automation system is described as being deployed in a home automation environment. The use of a home automation environment is illustrative only. The web-based device automation system and the secure external access method described herein can be applied to an automation environment deployed in any types of premises, such as an office, a warehouse, a factory, and other public or private premises.

Each of the devices 108 communicates with hub 104 to receive commands for actions to be performed or to report status or data. Devices 108 may communicate with hub 104 through a wired or a wireless connection. In one embodiment, devices 108 communicate with hub 104 using a low-power wireless protocol, such as Zigbee and Z-wave. Hub 104 in turn is connected to the data network 106, typically through a wired connection. In one embodiment, hub 104 maintains a persistent connection to the data network 106 to enable continuous monitoring and control of devices 108 by central server 102.

Central server 102 also supports communication with network-enabled computing devices, such as laptop computers, tablet computers, or smartphones. In the example shown in FIG. 1, a user may access the services provided by central server 102 using a smartphone 110 through a wireless or cellular connection. In another example, a user may access the services provided by central server 102 using a laptop computer (not shown) running a web user interface on a web browser.

In some embodiments, central server 102 further supports direct communication with devices. That is, central server 102 may communicate with devices directly without going through a hub. For example, a device 109 may communicate with central server 102 through a cellular network. In one example, the direct-communication device 109 is a sensor module installed in a car for monitoring the traveling speed of the car. In other examples, the direct-communication device is a location determination device or an outdoor temperature sensor.

In the present illustration, system 100 includes a single hub 104 communicating with a set of devices 108. The configuration shown in FIG. 1 is illustrative only and not intended to be limiting. In other embodiments, system 100 may include two or more hubs 104, each hub communicating with its own set of devices 108. Central server 102 is informed of the configuration of the hubs and the associated devices to enable remote control and monitoring of the devices through their respective hubs. In embodiments of the present invention, the configuration of devices and hubs and their interconnection in a user's environment is sometimes referred to as a physical graph. More specifically, a physical graph describes the devices that are in a user's automation environment, including devices 108 and direct communication devices 109, and the interconnection of the devices and one or more hubs in the environment. The physical graph, being a virtual representation of the physical devices in the user's environment, enables visibility into the status of devices and the events the devices are generating within the user's environment. The physical graph also enables control over the state of the devices and the events generated by the devices.

FIG. 1 further illustrates an embodiment of central server 102. The example shown is a representation of logical components that may be included in central server 102, in some embodiments. In the embodiment shown in FIG. 1, central server 102 includes a connectivity interface 114 configured to communicate with hub 104 over the data network 106. The connectivity interface 114 may further be configured to communicate with mobile devices, such as smartphone 110, over a cellular network. Connectivity interface 114 implements the necessary communication protocols to communicate with the hub 104 over the data network 106 and further implements the necessary communication protocols to communicate with mobile devices over a cellular network. In one embodiment, connectivity interface 114 maintains a persistent connection to the data network 106 and to one or more cellular network to enable continuous connection to the hubs in the system and to one or more mobile devices or direct-communication devices accessing the system.

Central server 102 includes a processing and execution module 120 configured to process and route events within system 100 as well as to handle execution of automation applications, also referred to as "Apps" on the central server. Automation applications or Apps are software components of the web-based device automation system 100 used to monitor, control and automate devices 108, 109 that are installed in an environment or at a location. In system 100, an automation application or an App is a collection of event handlers or a collection of event handlers and controls that operates to respond to various types of events that occur within system 100. In the present description, an event handler is the software component for servicing an event to which an App is subscribed. In brief, an App defines event handlers, subscribes to events and the App is invoked when a specified event occurs.

In embodiments of the present invention, the central server 102 may include a web interface 130, such as a mobile application interface or an API, supporting communication between the central server 102 and external web services. Finally, central server 102 includes a database 124 for storing automation applications, user physical graphs, event store and other data. In physical implementations, the central server 102 may include one or more processors performing the functions of the logical blocks shown in FIG. 1.

In embodiments of the present invention, the operation of the central server 102, including the processing and execution module 120, the database 124, the connectivity interface 114 and the web interface 130, is implemented in accordance with the device automation central servers described in copending and commonly assigned U.S. patent application Ser. No. 13/838,630, entitled "Distributed Control Scheme For Remote Control And Monitoring Of Devices Through a Data Network," and U.S. patent application Ser. No. 13/838,687, entitled "Device-Type Handlers For Remote Control And Monitoring Of Devices Through A Data Network," which applications are incorporated herein by reference in their entireties. The operation of the central server 102 in processing and handling events in system 100 and in executing automation applications will not be further described.

As thus configured in FIG. 1, system 100 has stored thereon one or more automation applications (Apps) and the automation applications are made available to users for installation by using the mobile application or the web interface. A user, making use of one or more automation applications, operates one or more of devices 108 remotely based on specified events. For example, a user may select an automation application (e.g. Light.On) which detects motion at a motion sensor device and as a result of the detected motion, actuates a light switch to turn on a light. The detected motion constitutes an event while the actuation of the light switch constitutes an action. In another example, a user may select an automation application (e.g. Arrive.Home) which detects the opening of a door through a contact sensor and as a result of the detected state of the door, generates a web service call to check the weather or send a SMS message to a given mobile telephone number. The detected opening of the door constitutes an event while the web service call or SMS message constitutes another event raised by the App. By selecting the desired App, a user may configure one or more devices or appliances in his environment to respond to specified events.

In some applications, device automation system 100 supports communication with external systems to allow an external system to have access to and/or control over devices 108, 109. In the present description, an external system is a system that is separated from, not part of or not related to the device automation system 100. The external system may be a server or a website. However, security is important when providing such external access as the devices are often deployed in a user's home or office. In particular, it is important for the user to be able control which external system has access to which of the user's devices. In embodiments of the present invention, the device automation central server 102 implements a secure external access method where access to devices 108, 109 in system 100 by an external system 150 is implemented through web service automation applications that are installed and configured by the user. In particular, the installation and configuration of a web service automation application exposes unique external access endpoints (or web service access endpoints) which can be used by an authorized external system to access authorized devices within system 100. The web service automation application also defines endpoint methods or event handlers for processing requests received through the unique external access endpoints. In this manner, external access to devices 108, 109 are provided only when the user desires and authorizes the access and the external access is only given to devices that the user designates. In one embodiment, the user installs a web service automation application and configures the web service automation application to authorize one or more devices for external control.

More specifically, under the secure external access method of the present invention, a web service automation application exposes one or more external access endpoints 140, such as API (application programming interface) endpoints, to enable external systems, such as external system 150, to access and/or control one or more devices 108, 109 through central server 102. It is imperative to note that the external access endpoints 140 are separate and distinct from the web interface or API 130 that is associated with the central server 102. Web interface 130 associated with the central server 102 behaves as a "static" access endpoint that is defined by central server 102 to provide access by external systems for certain aspect of system 100. The static access endpoint of web interface 130, also referred to as a "standard access endpoint," is predefined and always in existence and is provided to allow external systems to make certain requests of system 100. The static access endpoint of web interface 130 is not intended for use to access devices in a user's home automation environment.

On the other hand, the external access endpoints 140 are "dynamic" access endpoints or APIs that are defined or exposed by the installed instances of the web service automation applications. That is, the external access endpoints 140 are not in existence until a web service automation application is installed and configured. When a web service automation application is installed and configured, each installed instance of the web service automation application defines or exposes an external access endpoint 140. Accordingly, each external access endpoint 140 is unique for each installed instance of a web service automation application. The web service automation application further defines the event handler to service access requests received from the external system on the specific access endpoints. In other words, each web service automation application defines responses to external access requests.

The secure external access method of the present invention enables central server 102 to provide external systems with secure and authorized access to devices 108, 109. In embodiments of the present invention, the secure external access method uses a user authentication, such as the OAUTH2 authentication method, to authenticate external access requests. Furthermore, the secure external access method of the present invention requires the user to specifically authorize the external access to specific devices in the user's home automation environment. Accordingly, the external access endpoints run in the security context determined by the user at time the web service automation application is installed and configured. The secure external access method ensures security when providing access by external systems to devices within a user's home automation environment under the control of device automation system 100.

Figure 2:
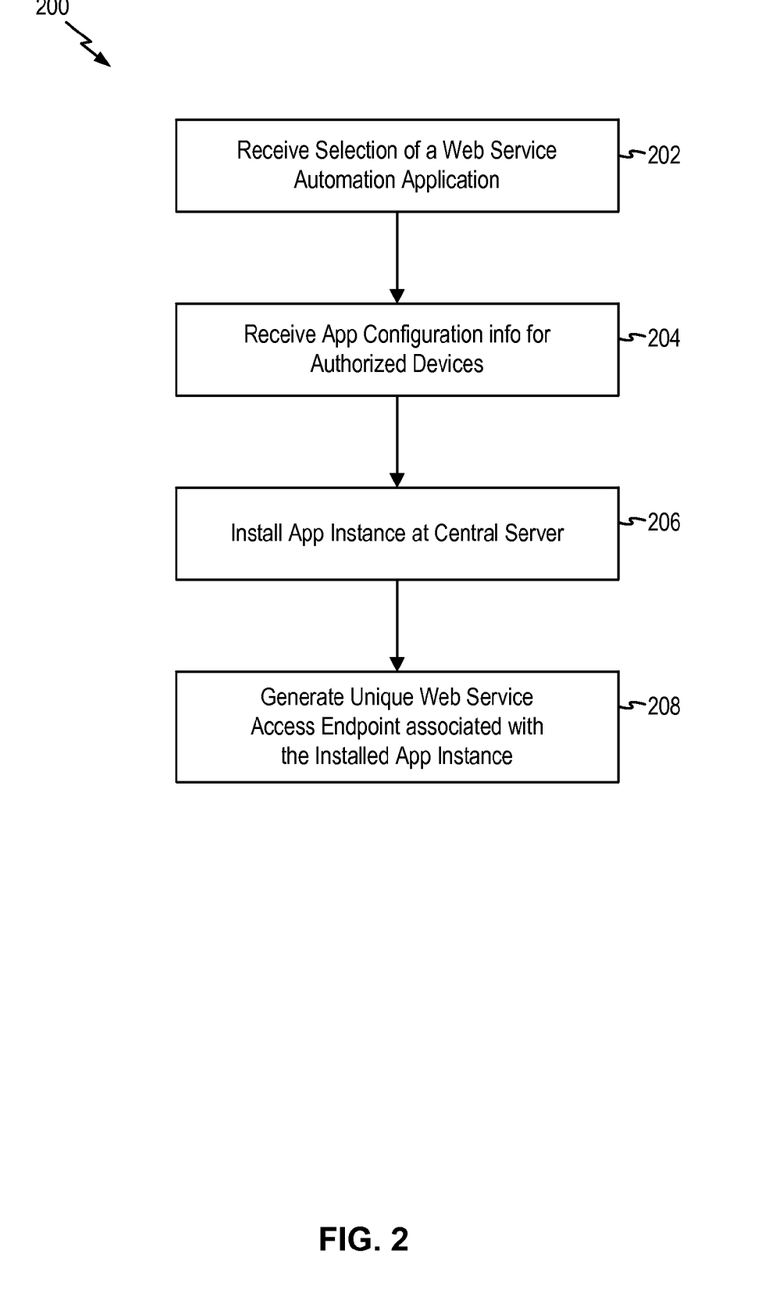
FIG. 2 is a flow chart illustrating the secure external access method in embodiments of the present invention.

FIG. 2 is a flow chart illustrating the secure external access method in embodiments of the present invention. Referring to FIG. 2, the secure external access method 200 starts by receiving, at the central server, a selection of a web service automation application (202). In system 100, one or more web service automation applications (Apps) are stored in database 124 and the web service automation applications are made available to users for installation through the mobile application or web interface. Each web service automation application (App) may be associated with a specific external system or services and includes one or more event handlers for processing the external access requests. In one embodiment, a user desiring to enable external access for one or more of the user's devices in the user's automation environment logins in the central server 102 and selects a web service automation application associated with the desired external system. Alternately, in another embodiment, the user may connect to the external system to initiate the App installation process. Through the external system, the user communicates with the central server 102 for authentication and the authentication process incorporates therein the selection and installation of the web service automation application for that external system. Regardless of the method being used to select the web service automaton application for installation, the secure external access method 200 receives a selection of a web service automation application to be installed.

At 204, the method 200 receives configuration information for the selected web service automation application. The configuration information identifies physical devices in the user's automation environment (such as a home) that are authorized for access by the external system. In this manner, the user restricts the external access to only devices that are specifically authorized by the user. Other devices in the user's automation environment are not accessible by the external system.

At 206, the selected web service automation application is installed for the user. When a web service App is installed, a specific instance of that App is created for the user. The installed instance of the web service App is assigned a unique App identifier. At 208, with the installation of the web service App, the secure external access method 200 generates a unique web service access endpoint (or an external access endpoint) associated with the installed App instance. In this manner, a unique web service access endpoint is generated or exposed for a specific installed instance of a web service App. The unique web service access end point can then be used by the external system to access and control the authorized devices defined in the installed App instance. In some embodiment, the external system uses a discovery process to obtain the unique web service access endpoint, as will be described in more detail below.

Figure 3:
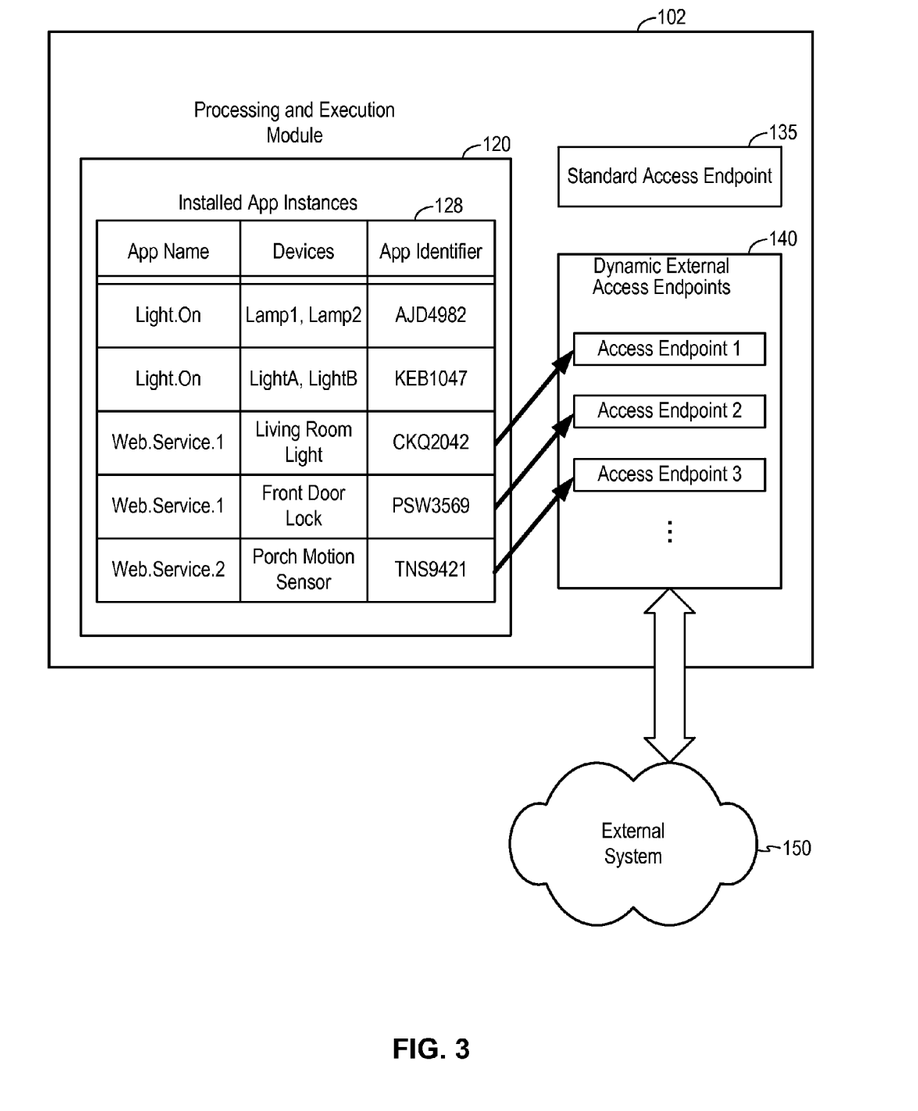
FIG. 3 is a diagram illustrating the generation of external access endpoints in response to installed App instances in the central server of the web-based device automation system according to one embodiment of the present invention.

FIG. 3 is a diagram illustrating the generation of external access endpoints in response to installed App instances in the central server of the web-based device automation system according to one embodiment of the present invention. Referring to FIG. 3, a user desiring to enable external access for one or more of the user's physical devices in the user's automation environment accesses the central server 102 and selects a web service automation application for installation. After the user configures the selected web service automation application, the web service App will be installed on the central server 102 for execution on the central server 102. In system 100, when an App is installed by a user, the installed App is given a unique identifier that identifies the specific instance of the App that is installed by that user. Central server 102 maintains a database of these unique App identifiers. In one example, the central server 102 stores the installed App instances and the associated unique App identifiers in a table 128. In the present example, each entry in table 128 represents an installed instance of an automation application and includes the name of the installed App, the devices configured for that App, and the unique App identified assigned to that specific installed instance of the App.

For example, the Light.On App may be installed by two different users or by the same user for difference devices. Each installed instance of the Light.On App is given a unique App identifier and identifies the devices that the App is configured for. In a first installed instance of the Light.On App, the App is configured to operate only Lamp1 and Lamp2 and the installed instance of the Light.On App is assigned an App Identifier of "AJD4982." In a second installed instance of the Light.On App, the App is configured to operate only LightA and LightB and the installed instance of the Light.On App is assigned an App Identifier of "KEB1047." To enable external access, a web service automation application, such as Web.Service.1 App or Web.Service.2 App, may be installed. Each installed instance of the Web.Service.1 App or Web.Service.2 App is given a unique App identifier. In embodiments of the present invention, the secure external access method generates or exposes external access endpoints 140 associated with each App identifier to realize secure and authorized access to devices in system 100. In the present example, each installed instance of the Web.Service.1 App and Web.Service.2 App is given a unique App identifier and is also associated with a unique external access endpoint (e.g. Access Endpoint 1, Access Endpoint 2, Access Endpoint 3). In some embodiments, the App Identifier is provided by the central server in the access token given to an authenticated external system so that subsequent external access calls can be made to the associated unique external access endpoint to access the specific installed instance of the web service App.

In some embodiments, the external access endpoints 140 are API endpoints. An installed instance of a web service automation application exposes an API endpoint in the form of a unique URL (uniform resource locator) or a web address. Once the external system has been authenticated and granted authorized access, the external system can make API requests against the URL. The API requests can be in the form of a HTTP request, an API calls, or a web service call and typically involves a HTTP operation. Example HTTP operations include get, post, put, and delete. In one embodiment, the external system includes in the HTTP header the credential information, such as the App identifier, that identifies the installed instance of the web service App.

In some embodiment, the external system 150 may use a discovery process to discover the unique external access endpoint assigned to the specific installed instance of the App. In one example, the external system 150 communicates through a standard access endpoint 135 to discover the unique external access endpoint. The standard access endpoint 135 may be the web interface API 130 of system 100 or may be a separate static access endpoint in existence for central server 102 to enable communication with external systems for certain purposes but not for controlling of physical devices.

Figure 4:
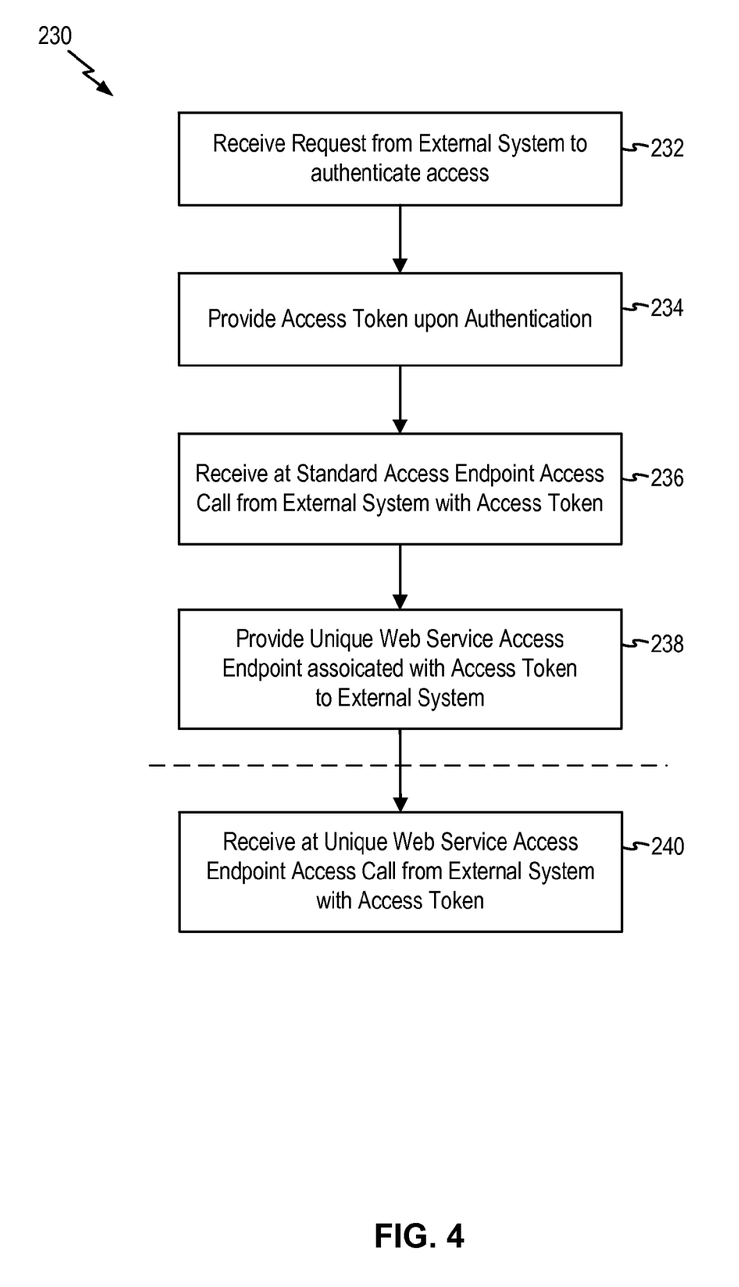
FIG. 4 is a flow chart illustrating the external access endpoint discovery method in embodiments of the present invention.

FIG. 4 is a flow chart illustrating an external access endpoint discovery method in embodiments of the present invention. Referring to FIG. 4, an external access endpoint discovery method 230 starts when the central server 102 receives a request from an external system to authenticate access (232). The request is typically accompanied with an access grant code belonging to an authenticated user. In some embodiments, the request is also accompanied by a client ID and a client secret which are assigned to the web service App associated with the external system and are known only by the external system. The central server uses the access grant code and the client ID and client secret to authenticate the access request.

At 234, upon authentication of the access grant code, the external access endpoint discovery method 230 provides an access token to the external system. The access token includes the App Identifier associated with the installed instance of the web service App. Accordingly, the access token is specific to the installed instance of the web service App and is therefore specific to a unique external access endpoint assigned to the installed instance of the web service App.

At 236, the external access endpoint discovery method 230 receives at the standard access endpoint an external access call from the external system. The external access call, which can be an API call, includes the access token. At 238, the external access endpoint discovery method 230 provides the unique web service access endpoint associated with the access token to the external system. The external system can now make access call using the unique access endpoint to control or monitor authorized devices associated with the installed instances of the web service App. For example, at 240, the central server 102 may receive from the external system an external access call at the unique web service access endpoint. The external access call is typically accompanied by the access token. The central server 102 executes instructions in the event handlers associated with the web service App and may respond to the external access call.

In embodiments of the present invention, the secure external access method grants access to an external system only when the user authenticate and authorize the external access in two steps. First, a web service App is installed in the user's account or the user's physical graph. At the installation of the web service App, the user configures the App to specify device preferences for external access. That is, the user installs the web service App and specifies which of the one or more devices in the user's automation environment is/are to be granted access. Second, the external system is authenticated using a robust authentication mechanism, such as the OAUTH2 authentication method, which grants the access token required for external access. As a result, an external system is granted access after authentication and the access is granted only for devices specified by the user. In the following description, different embodiments for implementing the secure external access method are described.

Figure 5:
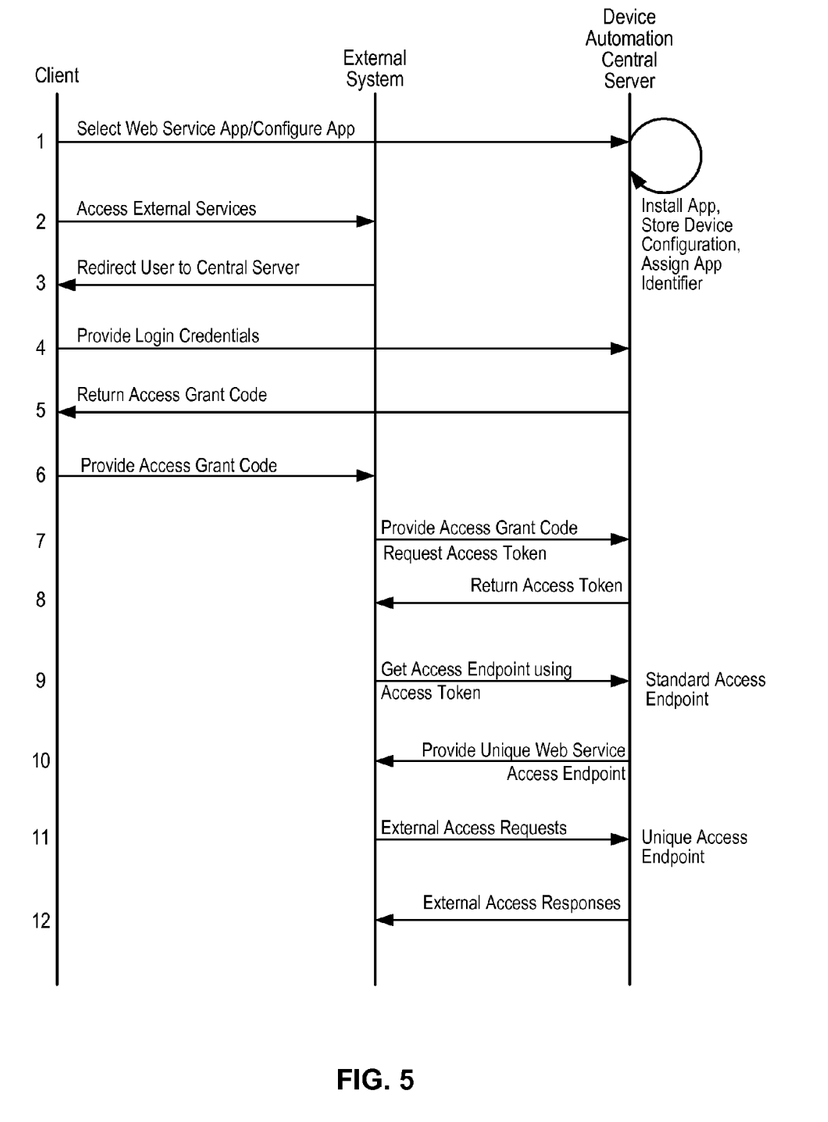
FIG. 5 illustrates the protocol flow of the secure external access method in a first embodiment of the present invention.

FIG. 5 illustrates the protocol flow of the secure external access method in a first embodiment of the present invention. The secure external access method shown in FIG. 5 may be implemented in a device automation system, such as system 100 of FIG. 1. The secure external access method of FIG. 5 will be described with reference to FIG. 1. Referring to FIG. 5, at 1, a user using a client device accesses the central server 102 to select a web service automation application ("web service App") for installation. The web service App is associated with the external system, such as external system 150, to which external access is to be granted. The client device may be a computing device, such as a laptop computer or a mobile phone. The user configures the web service App to specify which devices in the user's automation environment are to be granted access by the external system. The central server 102 installs the web service App and stores the physical device configuration for the App as specified by the user. As a result of the installation, the central server assigns an App identifier for this installed instance of the web service App for the user.

At 2, the user, using the client device, accesses the external system 150 to utilize external web services provided by the external system 150. The user may wish to use the external system 150 to control one or more of the user's devices in the user's automation environment. Alternately, the user may also wish to grant the external system access to monitor the user's devices. At the external system 150, the user takes an action for initiating external access to device automation system 100. At 3, the external system 150 redirects the user back to the central server 102 for authentication.

At 4, the user, through the client device, provides the login credentials to the central server 102. The login credentials may include a user name and a password. At 5, when the central server 102 authenticates the user, the central server returns an Access Grant Code to the client device. At 6, the Access Grant Code is provided to the external system 150 to obtain access to the central server 102. The external system uses the Access Grant Code, together with a client ID and a client secret known only to the external system, to request an Access Token from the central server. In one embodiment, the Access Grant Code takes the place of the end-user credentials and is only valid for a single use. Once the external system 150 obtains the Access Token, subsequent external access is made using the Access Token.

Accordingly, at 7, the external system provides the Access Grant Code, the client ID and the client secret to the central server. At 8, the central server 102, upon authenticating the Access Grant Code, provides an Access Token to the external system. The Access Token includes the App Identifier of the installed App instance. Hereinafter, the external system 150 may access central server and the authorized devices in the installed instance of the web service App using the Access Token. In one embodiment, the Access Token is an OAUTH2 Access Token.

After the Access Token is granted, the external system 150 proceeds to discover the unique external access endpoint 140 (or "web service access endpoint"), such as an API endpoint, associated with the installed instance of the web service App. At 9, the external system 150 makes an access call to the standard access endpoint of the central server 102 to request to the unique external access endpoint. The request is accompanied by the Access Token. In one embodiment, the external system 150 makes an API call to a static endpoint service on the central server which exists on a standard URL. At 10, the endpoint service of the central server returns the specific access endpoint (such as an URL) associated with the Access Token. The external system should use the specific access endpoint for all subsequent access calls or requests.

At 11, the external system may now use the specified access endpoint (or URL) to gain access to authorized devices of the user. The external access requests are accompanied by the Access Token. The external access requests can be API calls to the central server. In this manner, the external system may control or access devices authorized by the user through the installed instance of the web service App. At 12, the central server 102 may provide a response, such as an API response, to the external system 150.

Figure 6:
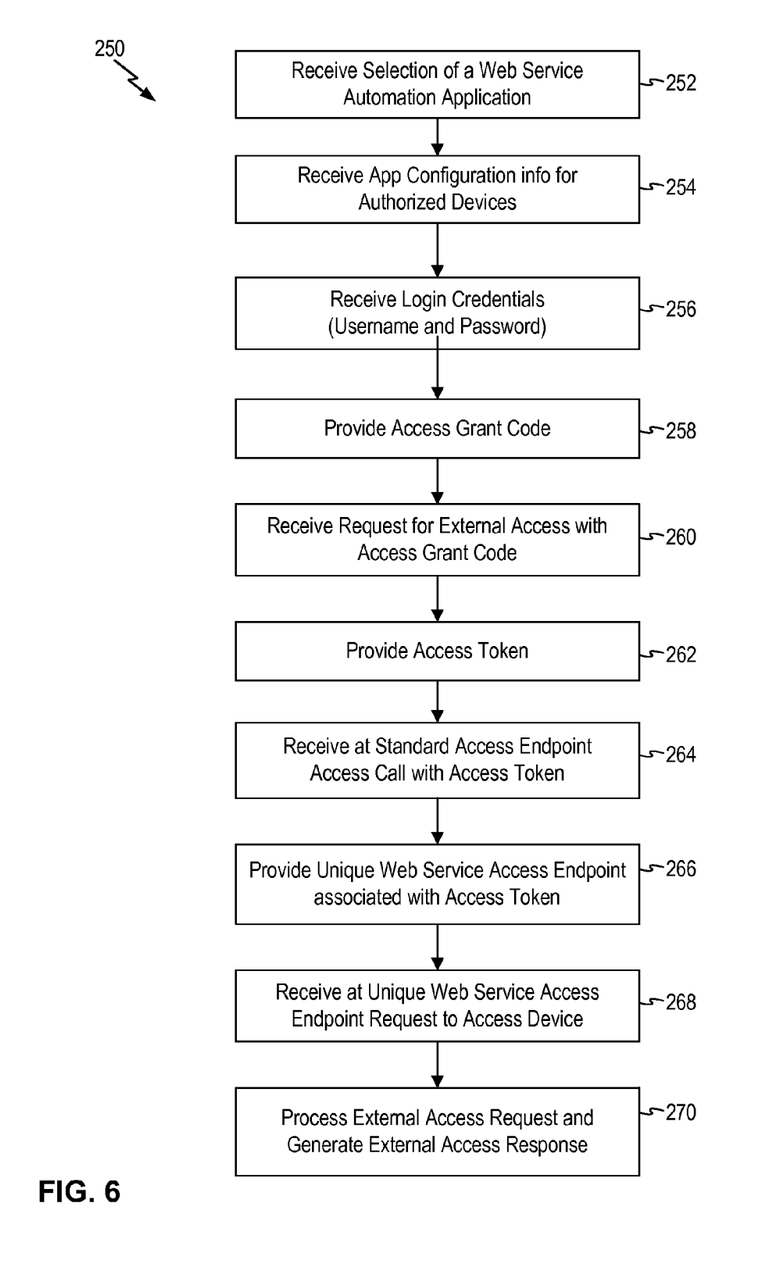
FIG. 6 is a flow chart illustrating the secure external access method implemented at the central server of the device automation system according to a first embodiment of the present invention.

FIG. 6 is a flow chart illustrating the secure external access method implemented at the central server of the device automation system according to a first embodiment of the present invention. The method of FIG. 6 may be implemented in the device automation system 100 of FIG. 1. Referring to FIG. 6, the automation application based external access method 250 ("method 250") starts when the central server receives a selection of a web service automation application associated with an external system (252). For example, a user, using a client device, may access the central server to select a web service automation application for installation. Then, the client device provides application configuration information identifying authorized devices for the web service automation application. The central server receives the configuration information for the authorized devices (254). Then, subsequently, when the client device wish to implement external access, the central server receives login credentials from the client device (256). The login credentials can be in the form of a login username and password.

The central server provides an Access Grant Code after the login credentials are authenticated (258). The client device provides the Access Grant Code to the external system to allow the external system to gain access to the central server. Next, the central server receives a request for web services access or API access from the external system with the Access Grant Code, together with the client ID and the client secret known only to the external system (260). When the Access Grant Code is authenticated, the central server provides an Access Token to the external system (262). The Access Token includes the App Identifier of the installed App instance. Then, method 250 receives at the standard access endpoint an access call with the Access Token (264). The method 250 then provides the specific external access endpoint, such as an API endpoint, associated with the Access Token to the external system (266). With the Access Token and the specific external access endpoint, the external system may then make access calls to the central server. At 268, the central server receives an access call requests with the Access Token. At 270, the central server processes the access call request and generates an external access response.

Figure 7:
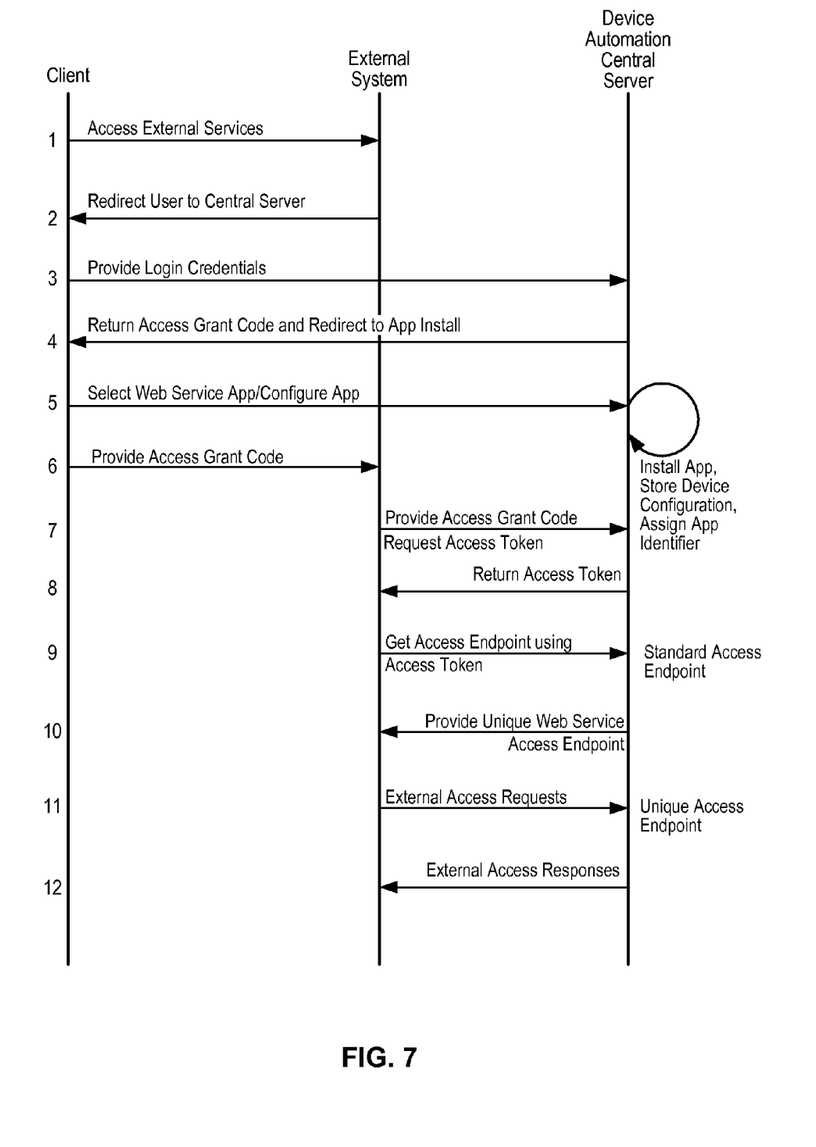
FIG. 7 illustrates the protocol flow of the secure external access method according to a second embodiment of the present invention.

FIG. 7 illustrates the protocol flow of the secure external access method according to a second embodiment of the present invention. The secure external access method shown in FIG. 7 may be implemented in a device automation system, such as system 100 of FIG. 1. The secure external access method of FIG. 7 will be described with reference to FIG. 1. Referring to FIG. 7, at 1, a user, using a client device, accesses the external system 150 to utilize external web services provided by the external system 150. The client device may be a computing device, such as a laptop computer or a mobile phone. The user may wish to use the external system 150 to control one or more of the user's physical devices in the user's automation environment. Alternately, the user may also wish to grant the external system access to monitor the user's devices. At the external system 150, the user takes an action for initiating external access to device automation system 100. At 2, the external system 150 redirects the user back to the central server 102 for authentication.

At 3, the user, through the client device, provides the login credentials to the central server 102. The login credentials may include a user name and a password. At 4, when the central server 102 authenticates the user, the central server returns an Access Grant Code to the client device. The center server 102 also redirects the client device to install a web service automation application associated with the external system. At 5, the user, using the client device, accesses the central server 102 to select a web service automation application ("web service App") for installation. The user configures the web service App to specify which devices in the user's automation environment is to be granted access by an external system, such as external system 150. The central server 102 installs the web service App and stores the device configuration for the App as specified by the user. As a result of the installation, the central server assigns an App identifier for this installed instance of the web service App for the user.

At 6, the Access Grant Code is provided to the external system 150 to obtain access to the central server 102. The external system uses the Access Grant Code, together with a client ID and a client secret known only to the external system, to request an Access Token from the central server. In one embodiment, the Access Grant Code takes the place of the end-user credentials and is only valid for a single use. Once the external system 150 obtains the Access Token, subsequent external access is made using the Access Token.

Accordingly, at 7, the external system provides the Access Grant Code, the client ID and the client secret to the central server. At 8, the central server 102, upon authenticating the Access Grant Code, provides an Access Token to the external system. The Access Token includes the App Identifier of the installed App instance. Hereinafter, the external system 150 may access central server and the authorized devices in the installed instance of the web service App using the Access Token. In one embodiment, the Access Token is an OAUTH2 Access Token.

After the Access Token is granted, the external system 150 proceeds to discover the unique external access endpoint 140, such as an API endpoint, associated with the installed instance of the web service App. At 9, the external system 150 makes an access call to the standard access endpoint of the central server 102 to request to the unique external access endpoint. The request is accompanied by the Access Token. In one embodiment, the external system 150 makes an API call to a static endpoint service on the central server which exists on a standard URL. At 10, the endpoint service of the central server returns the specific access endpoint (such as an URL) associated with the Access Token which includes the App identifier. The external system should use the specific access endpoint for all subsequent access calls or requests.

At 11, the external system may now use the specified access endpoint (or URL) to gain access to authorized devices of the user. The external access requests are accompanied by the Access Token. The external access requests can be API calls to the central server. In this manner, the external system may control or access devices authorized by the user through the installed instance of the web service App. At 12, the central server 102 may provide a response, such as an API response, to the external system 150.

Figure 8:
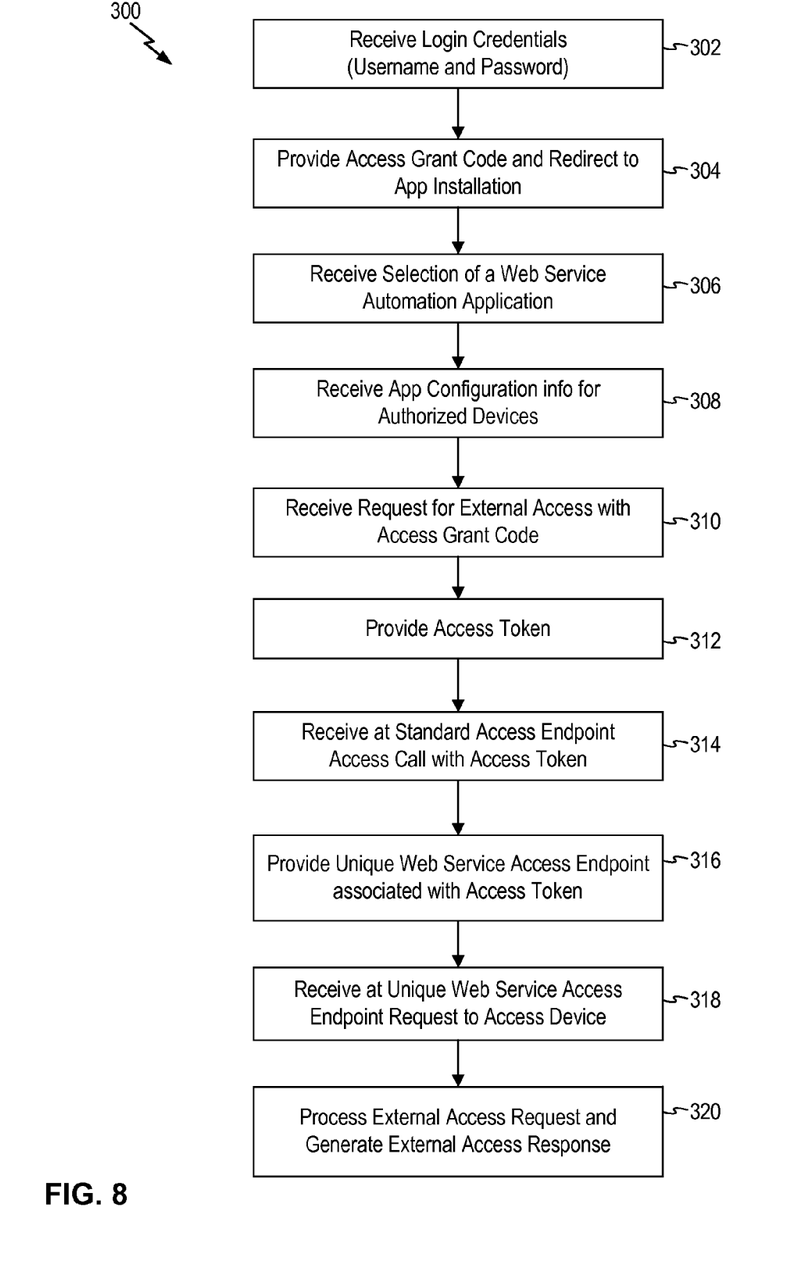
FIG. 8 is a flow chart illustrating the secure external access method implemented at the central server of the device automation system according to a second embodiment of the present invention.

FIG. 8 is a flow chart illustrating the secure external access method implemented at the central server of the device automation system according to a second embodiment of the present invention. The method of FIG. 8 may be implemented in the device automation system 100 of FIG. 1. Referring to FIG. 8, the secure external access method 300 ("method 300") starts when the central server receives login credentials from a client device (302). For example, a user, using a client device, may wish to implement external access and may access an external system for establishing the external access. The external system may redirect the client device back to the central server for login and authentication. The login credentials can be in the form of a login username and password.

At 304, the central server provides an Access Grant Code after the login credentials are authenticated. The central server also redirects the client device to install a web service automation application associated with the external system. At 306, the central server receives a selection of a web service automation application. Then, the client device configures the web service App by identifying authorized devices for which external access is to be granted. The central server receives the configuration information for the authorized devices (308).

The client device provides the Access Grant Code to the external system to allow the external system to gain access to the central server. Next, the central server receives a request for web services access or API access from the external system with the Access Grant Code, together with the client ID and the client secret known only to the external system (310). When the Access Grant Code is authenticated, the central server provides an Access Token to the external system which includes the App Identifier (312). Then, method 300 receives at the standard access endpoint an access call with the Access Token (314). The method 300 then provides the specific external access endpoint, such as an API endpoint, associated with the Access Token to the external system (316). With the Access Token and the specific external access endpoint, the external system may then make access calls to the central server. At 318, the central server receives at the unique external access endpoint an access call requests with the Access Token. At 320, the central server processes the access call request and generates an external access response.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing an external system access to a device automation system implementing automatic control of one or more devices in an automation environment associated with a user, the external system being separate from and not related to the device automation system, the method comprising:

receiving, at a central server, a selection of a web service automation application from a client device, the web service automation application being associated with the external system;

receiving, at the central server, configuration information for the selected web service automation application from the client device, the configuration information defining a first device selected from the one or more devices in the automation environment that is authorized for external system access by the external system;

installing, at the central server, the selected web service automation application to generate an installed instance of the web service automation application;

generating, at the central server, a web service access endpoint associated with the installed instance of the web service automation application, the web service access endpoint being an unique access endpoint to be used by the external system for accessing the installed instance of the selected web service automation application on the central server and to be used by the external system to access the authorized devices defined by the configuration information for the selected web service automation application; and in response to generating the web service access endpoint, enabling the external system to access the first device as the authorized device defined in the configuration information for the selected web service automation application.

2. The method of claim 1, further comprising:

receiving a request from the external system to authenticate access, the request including an access grant code associated with the automation environment associated with the user;

providing an access token to the external system in response to the access grant code being authenticated, the access token including an App identifier identifying the installed instance of the web service automation application;

receiving at a standard access endpoint an external access call from the external system including the access token; and in response to receiving the access token, providing the web service access endpoint associated with the installed instance of the web service automation application to the external system.

3. The method of claim 2, further comprising:

receiving from the external system at the web service access endpoint a request for access to the authorized devices, the request including the access token; and providing a response to the external system in response to the request for access.

4. The method of claim 1, wherein the web service automation application includes instructions for processing requests from the external system.

5. The method of claim 1, wherein generating, at the central server, a web service access endpoint associated with the installed instance of the web service automation application comprises:

generating, at the central server, an API endpoint associated with the installed instance of the web service automation application.

6. The method of claim 1, further comprising:

receiving from the client device login credentials associated the client device;

providing an access grant code to the client device in response to the login credentials being authenticated;

receiving from the external system a request for external access, the request including the access grant code;

providing an access token to the external system in response to the access grant code being authenticated, the access token including an App identifier identifying the installed instance of the web service automation application;

receiving from the external system a request for an external access endpoint, the request including the access token; and in response to receiving the access token, providing the web service access endpoint associated with the installed instance of the web service automation application to the external system.

7. The method of claim 6, further comprising:

receiving from the external system at the web service access endpoint a request for access to the authorized devices, the request including the access token; and providing a response to the external system in response to the request for access.

8. The method of claim 6, wherein receiving from the client device login credentials comprises:

receiving from the client device a username and a password.

9. The method of claim 6, wherein receiving from the client device login credentials associated the client device comprises receiving from the client device login credentials associated the client device before receiving from the client device the selection of a web service automation application; and receiving from the external system a request for external access comprises receiving from the external system a request for external access after the selected web service automation application is installed.

10. The method of claim 1, wherein prior to receiving from the client device the selection of the web service automation application, the method further comprises:

receiving from the client device login credentials associated the client device;

providing an access grant code to the client device in response to the login credentials being authenticated; and directing the client device to install the web service automation application.

11. The method of claim 10, further comprising:

receiving from the external system a request for external access, the request including the access grant code;

providing an access token to the external system in response to the access grant code being authenticated, the access token including an App identifier identifying the installed instance of the web service automation application;

receiving from the external system a request for an external access endpoint, the request including the access token; and in response to receiving the access token, providing the web service access endpoint associated with the installed instance of the web service automation application to the external system.

12. The method of claim 11, further comprising:

receiving from the external system at the web service access endpoint a request for access to the authorized devices, the request including the access token; and providing a response to the external system in response to the request for access.

13. The method of claim 10, wherein receiving from the client device login credentials comprises:

receiving from the client device a username and a password.

14. A system for providing an external system access to a device automation system implementing automatic control of one or more devices in an automation environment associated with a user, the external system being separate from and not related to the device automation system, the system comprising:

a processor at a central server of the device automation system configured to:

receive from a client device a selection of a web service automation application, the web service automation application being associated with the external system;

receive from the client device configuration information for the selected web service automation application, the configuration information defining a first device selected from the one or more devices in the automation environment that is authorized for external system access by the external system;

install the web service automation application to generate an installed instance of the web service automation application;

generate a web service access endpoint associated with the installed instance of the web service automation application, the web service access endpoint being an unique access endpoint to be used by the external system for accessing the installed instance of the selected web service automation application and to be used by the external system to access the authorized devices defined by the configuration information for the selected web service automation application; and in response to generating the web service access endpoint, enable the external system to access the first device as the authorized device defined in the configuration information for the selected web service automation application; and a memory coupled to the processor and configured to provide the processor with instructions.

15. The system of claim 14, wherein the processor is further configured to:

receive a request from the external system to authenticate access, the request including an access grant code associated with the automation environment associated with the user;

provide an access token to the external system in response to the access grant code being authenticated, the access token including an App identifier identifying the installed instance of the web service automation application;

receive at a standard access endpoint an external access call from the external system including the access token; and in response to receiving the access token, provide the web service access endpoint associated with the installed instance of the web service automation application to the external system.

16. The system of claim 15, wherein the processor is further configured to:

receive from the external system at the web service access endpoint a request for access to the authorized devices, the request including the access token; and provide a response to the external system in response to the request for access.

17. The system of claim 14, wherein the web service automation application includes instructions for processing requests from the external system.

18. The system of claim 14, wherein the web service access endpoint comprises an API endpoint.

19. The method of claim 1, further comprising:

receiving, at the central server, a second selection of a second web service automation application from the client device, the second web service automation application being associated with a second external system different from the external system;

receiving, at the central server, configuration information for the second selected web service automation application from the client device, the configuration information defining a second device selected from the one or more devices in the automation environment that is authorized for external system access by the second external system;

installing, at the central server, the second selected web service automation application to generate an installed instance of the second web service automation application;

generating, at the central server, a second web service access endpoint associated with the installed instance of the second web service automation application, the second web service access endpoint being an unique access endpoint to be used by the second external system for accessing the installed instance of the second selected web service automation application on the central server and to be used by the second external system to access the authorized devices defined by the configuration information for the second selected web service automation application; and in response to generating the second web service access endpoint, enabling the second external system to access the second device as the authorized device defined in the configuration information for the second selected web service automation application.

* * * * *